United States Patent [19]

Van Druten et al.

[11] Patent Number: 5,633,299
[45] Date of Patent: May 27, 1997

[54] WOOD COMPOSITE

[75] Inventors: Martinus L. Van Druten; Herman P. Ruyter; Aletta A. Ten Hoeve; Evert Van Der Heide; Gerrit Vietje, all of Amsterdam, Netherlands

[73] Assignee: Shell Oil Company, Houston, Tex.

[21] Appl. No.: 547,637

[22] Filed: Oct. 24, 1995

[30] Foreign Application Priority Data

Nov. 1, 1994 [EP] European Pat. Off. ............... 94203170

[51] Int. Cl.$^6$ ........................................... C08L 1/02
[52] U.S. Cl. ................... 524/14; 524/13; 524/16; 524/35
[58] Field of Search ................... 524/13, 14, 16, 524/35

[56] References Cited

U.S. PATENT DOCUMENTS

| | | | |
|---|---|---|---|
| 4,434,261 | 2/1984 | Brugel et al. | 524/109 |
| 4,520,169 | 5/1985 | Hagman et al. | 525/185 |
| 4,543,440 | 9/1985 | Loomis | 525/539 |
| 4,895,457 | 1/1990 | Lancaster et al. | 383/94 |
| 4,983,649 | 1/1991 | Smutny | 524/13 |

FOREIGN PATENT DOCUMENTS

| | | |
|---|---|---|
| 0372602A2 | 6/1990 | European Pat. Off. . |
| 0520568A2 | 12/1992 | European Pat. Off. . |
| 04058962A | 2/1992 | Japan . |

*Primary Examiner*—Peter A. Szekely

[57] ABSTRACT

The use of a curable resin composition as a binder in the production of a wood composite, wherein the curable resin composition comprises a copolymer of carbon monoxide with an olefinically unsaturated compound and a curing agent; a wood composite comprising wood parts adhered to one another by means of a cured binder which is obtainable by curing said curable resin composition; and an article of manufacture comprising said wood composite are provided.

12 Claims, No Drawings

WOOD COMPOSITE

FIELD OF THE INVENTION

This invention relates to the use of a curable resin composition as a binder in the production of a wood composite.

BACKGROUND TO THE INVENTION

Wood composites on the bases of a cured, i.e., crosslinked, resin which adheres the wood parts to one another exist for many years and form a mature market. Examples of such composites are plywood and particle board. In the manufacture of the wood compositions, curing is usually effected by applying a heat treatment. Examples of curable resins that are widely used in the manufacture of wood composites include urea formaldehyde resins and phenol formaldehyde resins. Although these resins are being used, the wood composites prepared therewith have an unsatisfactory performance in important market segments, viz., those wherein there is a demand for a high impact resistance or a demand for a good dimensional stability of the composite in the presence of moisture.

The present invention provides improved wood composites which are based, as regards the binder, on a copolymer of carbon monoxide and an olefinically unsaturated compound and a curing agent. The composites of the present invention have improved impact resistance/strength balance and improved dimensional stability compared to wood composites based on prior art binders. They are also tougher and more homogeneous. The binder may be applied at a surprisingly low amounts.

Moreover, when the binder is also applied at the outer surface of the composite a composite with a soft "hand feel" is obtained after curing. This constitutes an advantage over wood composites which have a conventional binder as a surface coating. A soft hand feel implies that the surface feels as if it has had a polish treatment.

SUMMARY OF THE INVENTION

Accordingly, the present invention relates to the use of a curable resin composition as a binder in the production of a wood composite, wherein the curable resin composition comprises a copolymer of carbon monoxide with an olefinically unsaturated compound and a curing agent.

The invention also relates to a curable resin composition comprising a copolymer of carbon monoxide with an olefinically unsaturated compound, a diluent and a curing agent.

The invention further relates to a wood composite comprising wood parts adhered to one another by means of a cured binder which is obtainable by curing a curable resin composition which contains a copolymer of carbon monoxide with an olefinically unsaturated compound and a curing agent, and to articles of manufacture comprising a wood composite according to this invention.

It will be clear that in the present context wood composites are understood to be semi-manufactured articles which can be used in production of finished products or articles of manufacture. In such production the composites may be further processed and/or composite parts may be joined together or to other parts by suitable means, such as screws or construction glue.

By microscopic investigation it has surprisingly been found that upon contacting wood particles with a curable binder according to this invention the surface of the wood softens and cell walls collapse so that an intimate contact between wood particles at the interface can be accomplished. This results in more or less "seamless" connections between the wood particles at the points of attachment. Softening of the wood surface, collapse of cell walls, and formation of seamless connections do not occur when a conventional binder is used. Without wishing to be bound by theory it is believed that, by virtue of these peculiar phenomena at the interphase between the present binder and the wood parts, the obtained composite is strong, highly impact resistant and very dimensional stable and that the surface can have a soft hand feel.

Another surprising find is that the curing of a binder according to this invention in the proximity of wood yields a product which is different from a product obtained by curing in the absence of wood. The binder obtained by curing in the proximity of wood possesses a glass transition point at about 135° C., which is absent when the curing is performed in the absence of wood. Thus, upon application of a sufficiently thin binder layer between the wood surfaces, the transition at about 135° C. causes that the composite maintain its strength and stiffness up to a temperature of about 140° C. It is also surprising that the application of such a thin binder layer does not diminish the overall strength and stiffness of the composite.

EP-A-372602 disclosed curable polymer compositions on the basis of a linear alternating copolymer of carbon monoxide with an olefinically unsaturated compound and a curing agent, in particular for use as a metal coating. This reference did not refer to the use of the polymer composition in connection with wood so that the present results are indeed unexpected.

The species and the form of the wood parts which are used for producing the composites are not critical. The wood may be a high or a low density wood and it may be a deciduous or a coniferous wood. Examples of suitable species are oak, chestnut, ash, maple, teak, okoume, mahogany, meranti and pine. Very good results can be obtained with beech, spruce and poplar. The wood does not need any pretreatment other than which may normally be applied when a conventional binder is used. It is generally sufficient to bring the wood parts in the size and shape desired for the type of composite to be produced, for example, by applying mechanical and/or chemical means. Suitably the wood is used in the form of planks, veneers, timber, lamellae, chips or pulp. A combination of two or more species or forms of wood parts may be used, for example, to improve the appearance of the composite.

The wood may be pretreated to increase its durability. An example of such a pretreatment is treatment with superheated steam at 150°–220° C. under pressure followed by heating at 100°–220° C. at ambient pressure. Another pretreatment is salt impregnation with, e.g., chromium, copper, mercury, arsenic salts or combinations thereof.

The binder used in the present invention contains a copolymer of carbon monoxide and an olefinically unsaturated compound. Preferably the copolymer contains 1,4-dicarbonyl entities in its polymer chains because this arrangement accommodates certain curing reactions, such as the curing with poly-primary-amines, which will be elaborated hereinafter.

Copolymers of carbon monoxide and an olefinically unsaturated compound are known. They can be prepared by palladium catalyzed polymerization using the methods known from, for example, EP-A-121965, EP-A-181014 and EP-A-516238 (the disclosures of which are incorporated herein by reference). The polymers so prepared may be linear alternating copolymers of carbon monoxide and the olefinically unsaturated compound(s), i.e., copolymers of which the polymer chains contain the monomer units originating in carbon monoxide (i.e., carbonyl groups) and the monomer units originating in the olefinically unsaturated compound(s) in an alternating arrangement, so that substantially every fourth carbon atom of the polymer chain belongs to a carbonyl group. Alternative copolymers of carbon monoxide and an olefinically unsaturated compound which contain 1,4-dicarbonyl entities may be random copolymers, i.e., copolymers of which the polymer chains contain said monomer units in a random order. The latter copolymers can be prepared, for example, by radical initiated polymerization using the methods known from, for example, U.S. Pat. No. 2,495,286 and U.S. Pat. No. 4,024,326 (the disclosures of which are incorporated herein by reference).

It is preferred to employ in the curing reaction an alternating copolymer of carbon monoxide and an olefinically unsaturated compound because these have a higher content of carbonyl groups in the polymer chain than the random copolymers so that the curing can be accomplished easily at a high level of crosslinking. If, nevertheless, a low degree of crosslinking is desired, the presence of carbonyl groups, which are not converted in the curing reaction, may contribute advantageously to the mechanical properties of the binder, and hence to the properties of the wood composite.

The said copolymers of carbon monoxide and an olefinically unsaturated compound may be based on a hydrocarbon as the olefinically unsaturated compound, but the olefinically unsaturated compound may also contain a heteroatom, such as in vinyl acetate, ethyl acrylate and N-vinylpyrrolidone. It is preferred that the copolymer is based on an olefinically unsaturated hydrocarbon, suitably an $\alpha$-olefin, in particular an $\alpha$-olefin having up to 10 carbon atoms. Very suitable are aliphatic $\alpha$-olefins, in particular those having from 3 to 6 carbon atoms and more in particular those having a straight carbon chain, such as propene, 1-butene, 1-pentene and 1-hexene. Propene is most preferred.

In particular when the copolymer of carbon monoxide and an olefinically unsaturated compound is an alternating copolymer of carbon monoxide and an -olefin having more than three carbon atoms the $\alpha$-olefin may be incorporated predominantly in a regioregular fashion or in a regio-irregular fashion. The use of a regio-irregular polymer has an advantage in that its viscosity is lower than that of an otherwise comparable regioregular polymer. On the other hand, there may be a preference to employ copolymers which have the $\alpha$-olefin of at least three carbon atoms incorporated for more than 80%, more preferred for more than 90%, in a regioregular fashion, notably in a head-to-tail arrangement. This will effect that the carbonyl groups present in the polymer chain have the same or virtually the same steric and electronic environment so that they are more uniform in reactivity in the curing reaction than when the olefinically unsaturated compound is incorporated in a regio-irregular fashion. This is in particular the case when the copolymer is based on carbon monoxide and a single olefinically unsaturated compound, notably propene. It is not so critical whether or not the $\alpha$-olefin(s) having three or more carbon atoms is/are incorporated in the copolymer in a stereoregular manner. Good results can be obtained with atactic copolymers. For an explanation of the terms used to indicate the regio- and stereoregularity of the copolymer chains reference is made to EP-A-410543 (the disclosure of which is incorporated herein by reference).

The molecular weight of the copolymer may vary between wide limits. There is a preference for using copolymers which have a relatively low molecular weight, for example, a weight average molecular weight in the range of from 200 to 20,000, more preferably in the range of from 500 to 5000 and in particular from 1000 to 3000. The copolymers have typically a molecular weight distribution, such that their Q value amounts to 1.1–5, more typically 1.5–3, the Q value being the quotient of the weight average molecular weight and the number average molecular weight. An advantage of using copolymers which have a relatively low molecular weight, in particular when they are based on an $\alpha$-olefin having three or more carbon atoms, resides in the fact that they can be liquid at the temperatures generally used in processing the copolymer, which is frequently in the range of 10°–80° C., more frequently in the range of 20°–60° C. The processing of the copolymer encompasses, for example, the preparation of the binder used in this invention and the application of the binder onto the wood surface.

Very good results can be obtained with a regioregular atactic linear alternating copolymer of carbon monoxide with propene wherein the propene is incorporated for more than 90% in a head-to-tail fashion and which has a weight average molecular weight in the range of 500–5000.

It may also be advantageous to apply a copolymer of carbon monoxide with an olefinically unsaturated compound which copolymer has a bimodal molecular weight distribution. The lower molecular weight fraction provides that the copolymer is a liquid which is easily processable, as indicated above, and that the binder has an increased pot-life, viz. the time is increased that the binder can be kept at the temperature for processing without an appreciable increase of the viscosity as a result of crosslinking. The higher molecular weight fraction provides a rapid viscosity increase of the binder in the initial stage of the curing (so-called gelation) and also improves the quality of the cured binder in terms and stiffness and strength. Such a bimodal copolymer composition is obtainable, for example, by blending copolymers of carbon monoxide and an olefinically unsaturated compound, viz. a copolymer having a lower molecular weight with a copolymer having a higher molecular weight. The lower molecular weight copolymer is typically present in a quantity of 5–40% by weight, in particular 10–30% by weight, relative to the total weight of the copolymers, and has typically a weight average molecular weight of 500–2000, in particular 750–1500. The higher molecular weight copolymer is typically present in a quantity of 60–95% by weight, in particular 70–90% by weight, relative to the total weight of the copolymers, and has typically a weight average molecular weight of 2500–8000, in particular 4000–6000.

Many curing agents can in principle be used in the binder according to this invention. Suitable curing agents or curing systems are disclosed in EP-A-372602 (the disclosure of which is incorporated herein by reference) and may comprise, for example, an amine, a thiol or acrylonitril. With some of these reagents a derivative of the copolymer of carbon monoxide and an olefinically unsaturated compound is initially formed and the derivative thus formed can be further cured using known methods.

It may be advantageous to employ a mixture of curing agents. In particular a mixture of a relatively more reactive curing agent and a less reactive curing agent is useful. For example, straight chain aliphatic diamines may be used as the more reactive curing agent in combination with aromatic or cycloaliphatic poly-primary amines as the less reactive curing agent. By the presence of the more reactive curing agent a rapid gelling can be achieved once the curing has started. Upon prolonged curing the cyclic carbon skeleton of the less reactive curing agent will boost the mechanical strength of the composite at a high temperature. The molar ratio of the more reactive curing agent and the less reactive curing agent may vary between wide limits according to the requirements of the particular use of the binder. This molar ratio can be determined readily by the skilled person by applying routine experimentation. Typically the molar ratio will be in the range of from 2:08 to 98.2.

It will be appreciated by persons skilled in the art that the degree of crosslinking occurring during the curing is dependent, inter alia, on the quantity of curing agent used relative to the quantity of the copolymer of carbon monoxide and olefinically unsaturated compound. The relative quantity of curing agent may vary between wide ranges and by routine experimentation a preferred relative quantity can be established. When a poly-primary-amine is used as curing agent the molar ratio of the carbonyl groups in the copolymer and the primary amine groups of the curing agent is suitably in the range of from 0.25 to 8.0 and more suitably in the range of from 0.5 to 4.0.

The curing of the copolymer may be carried out in the presence of a curing catalyst or in the absence of any curing catalyst. Advantages of using a catalyst will generally be that the curing can be carried out at a lower temperature or during a shorter period of time. For the various curing reactions indicated hereinbefore suitable catalysts may be known in the art. When the curing agent is a poly-primary-amine suitable catalysts are weak acids, in particular acids having a $pK_a$ in the range of from 2 to 5.5, preferably in the range of from 2.5 to 5, when measured in water at 20° C. A preferred class of acids are the organic acids, in particular carboxylic acids, because these are at least to some extent soluble in the copolymer to be cured. Monocarboxylic acids are more preferred due to their generally better solubility in the copolymer. Examples of monocarboxylic acids are nicotinic acid, pivalic acid, valeric acid, acetic acid, benzoic acid and, in particular, salicylic acid. Another suitable weak acid is phosphoric acid.

The weak acid may be used in small quantities. Suitable 5 quantities are from 0.1 to 15.0% by weight relatively to the weight of the copolymer. More suitably, the weak acid is used in a quantity of from 0.2 to 10.0% by weight, in particular 0.5–8.0% w, on the same basis.

A diluent may be used in the curable resin composition to facilitate the application of the composition onto the wood parts, in particular such that a thin binder layer is formed. The quantity of diluent may be dependent of viscosity requirements of the application technique to be used or the desired binder layer thickness. A diluent may also improve the compatibility of the curing agent and any catalyst with the copolymer. Suitable diluents are, e.g., lower alcohols, lower ketones, lower esters, such as acetates, and lower ethers. The term "lower" is to be understood in the sense that the diluent comprises on average 5 or less carbon atoms per molecule. Preferred diluents are water and lower alcohols, in particular methanol, ethanol and isopropyl-alcohol, because these can be regarded as being relatively environmentally friendly. Examples of other suitable diluents are acetone, ethyl acetate, methyl propionate and ethylene glycol dimethylether. When the curable resin composition is to be applied, for example, by spraying, the viscosity may suitably be in the range of 0.005–30 Pa.s, preferably in the range of 0.03–10 Pa.s, more preferably in the range of 0.05–5 Pa.s, at the temperature of application. Preferably the diluent and the copolymer are used in a weight ratio of at least 1:5, in particular in the range of 1:2 to 5:1, more in particular 1:1.5 to 2:1.

It has been found that, very advantageously, the curable resin composition can be brought into the form of a paste which can easily be spread onto the wood surface in a convenient temperature range, for example, between 10° C. and 50° C. Such a paste consistency can be accomplished by applying in the binder a relatively small quantity of a diluent, such as water, a lower alcohol or a lower ketone. Typical quantities of diluent are in the range of 0.2–5.0% by weight relative to the weight of the copolymer, in particular 0.3–3.0%, more in particular 0.5–1.0% on the same basis. Very favorable results can be obtained by combining a linear alternating copolymer of carbon monoxide and an $\alpha$-olefin, the copolymer having a weight average molecular weight in the range of 200 to 20,000, with a poly-primary-amine, a weak acid, which may be used as the curing catalyst, and 0.2–5.0% by weight of a diluent, relative to the weight of the copolymer, and heating the obtained mixture at a temperature of between 30° C. and 100° C., preferably between 40° C. and 80° C. The heating time will depend on the temperature selected and may vary suitably between 5 and 50 minutes. A skilled person will be able to select on the basis of routine experimentation the length of the heating time which will provide an optimum consistency and quality of the paste. The paste obtained may be applied to the wood at the temperature applied in its preparation but it may also be used at ambient temperature. Additional advantages of this procedure are the low diluent requirement and the disappearance of the odor, if there is any, of the curing agent upon the heating. The paste thus prepared is therefore environmentally friendly and user friendly.

The binder may contain additional components which may be added to modify properties of the binder. Examples of suitable additional components are viscosity modifiers, flame retardants, gap filling agents, antioxidants, UV stabilizers and colorants. For example, clay may be used as a filler or it may be used to decrease the viscosity at high shear rate. A suitable gap filling agent is silica, cereal flour, or coconut shell flour. In particular when the binder is also used as a coating material the durability in air and light may be improved by the addition of antioxidants and UV stabilizers.

The present binder system may advantageously be stored, handled and used in the form of a kit of parts. Accordingly, the present invention also relates to this kit of parts. A first part of the kit comprises a composition of a copolymer of carbon monoxide with an olefinically unsaturated compound and a diluent and a second part comprises a composition of a curing agent and optionally a diluent. One or both of these compositions may comprise a curing catalyst as an additional component.

Very advantageously, the second part of the kit comprises, dissolved in a diluent, a poly-primary-amine in combination with a weak acid, described hereinbefore, which can be used as the curing catalyst in the curing of the copolymer with the poly-primary-amine. Namely, it has been found that by combining the poly primary-amine with at least a part of the weak acid which may be used as the curing catalyst, less diluent (for example, at least 10% less, more typically at least 20% less) can be used to dissolve the ingredients that the quantity which would be needed to dissolve under the same conditions, such as at 20° C., the poly-primary-amine alone. Suitable diluents for the combination of ingredients are water, lower alcohols, in particular methanol, and lower ketones, in particular ethylmethylketone. In this embodiment of the invention the second part of the kit contains suitably the poly-primary-amine in a quantity of 60–97% by weight, in particular 70–95% by weight, the weak acid in a quantity of 0.25–10% by weight, in particular 0.5–5% by weight, and the diluent in a quantity of 3–40% by weight, in particular 5–20% by weight, these quantities being relative to the weight of the second part. Examples of a preferred second part are liquids containing 1,6-diaminohexane, salicylic acid and water in a weight ratio of 88:2:10 or 1,6-diaminohexane, salicylic acid and ethylmethylketone in a weight ratio of 00:2:10.

The binder for use in this invention can be prepared by admixing the compositions of the first part and the second part of the kit.

The binder may be applied to the wood surface using any conventional technique. The binder, in particular the paste described hereinbefore, may be spread over the surface by using, for example, a brush, a roller, a knife or a blade. It has already been indicated that, after the addition of a suitable quantity of diluent, the binder can also be applied by spraying it by means of a nozzle driven by a compressed gas, for example, as in continuous in-line spraying or by using a paint-sprayer. If desired, when a composite having a soft hand feel is to be produced, the binder may also be applied as a coating at wood surfaces which will be positioned at the outer surface of the composite. It is also possible to coat the cured composite and to cure the coating in an additional curing step.

The quantity of binder relative to the quantity of wood may vary between wide limits and will generally be dependent of the type of composite to be produced.

For wood laminates this quantity may be specified per square meter of wood surface covered by the binder or per square meter of joint present between two wood lamellae. Per square meter of wood surface such a quantity of binder is typically wood which is based on 30–200 g and in particular 50–150 g of the copolymer of carbon monoxide with an olefinically unsaturated compound, which corresponds with ranges of 60–400 g and 100–300 g, respectively, of the copolymer per square meter of joint. As set out hereinbefore, when wood laminates are to be produced which possess advantageous high-temperature properties the layer of binder will be kept thin, for example, such that a quantity of binder is used per square meter of joint which is based on 5–60 g, in particular 10–40 g of the copolymer.

When the wood composite is a fiber board or a particle board the quantity of binder may more conveniently be related to the weight of the composite. Per kilogram of the fiber board or particle board typically such a quantity of binder is used which is based on 20–150 g, more typically 30–100 g of the copolymer of carbon monoxide with an olefinically unsaturated compound. For particle boards with improved high temperature properties it is recommended to employ somewhat less binder, for example, such a quantity of binder per kilogram of the fiber board or particle board which is based on down to 15 g or even down to 10 g of the copolymer. For special applications of fiber boards it may be desired to have the binder present as the continuous phase, in which cases per kilogram of the composite such a quantity of binder may be used which is based on 150–600 g and in particular 200–500 g of the copolymer of carbon monoxide with an olefinically unsaturated compound.

After, or simultaneously with, applying the binder onto the wood surface the wood parts are brought together, such that binder resides between wood parts, and curing conditions are subsequently applied. Furthermore, they have outstanding electrical properties, such as a very low electrical conductivity and a very high electrical strength. Usually the curing is effected by increasing the temperature. Pressure may be applied during the curing in order to effect that a larger portion of the binder is present in the binder layers between the wood parts, and to increase the density of the wood composite to be produced. The temperature and the pressure may vary between wide limits. The temperature will generally be dependent of the curing agent and the presence of a curing catalyst. The pressure may, in addition, be dependent of the species of the wood and, in particular, of the type of wood parts. When a poly-primary-amine is used as curing agent the temperature will suitably be above 50° C., for example, in the range of from 80° C. to 200° C., in particular 100° C. to 160° C. For laminates typical pressures are in the range of from 1 to 30 kg/cm$^2$, in particular from 2.5 to 25 kg/cm$^2$, and for fiber board and particle board typical pressures are in the range of from 50 to 150 kg/cm$^2$ in particular from 50 to 150 kg/cm$^2$, but higher and lower pressures are also possible. By routine experimentation the skilled person will be able to determine suitable curing times.

Various types of wood composites can be produced according to this invention, such as fiber board, particle board, for example, wafer board, and laminate, such as plywood and laminated beam or timber. The composites have an excellent impact resistance/strength balance and in the presence of moisture they have an excellent dimensional stability. Furthermore, they have outstanding electrical properties, such as a very low electrical conductivity and a very high electrical strength. Hence, the composites can advantageously be applied in the production of, for example, doors, parquet flooring, sport articles, such as hockey sticks and electrical appliances, such as switchboards and panels for distributing boxes. Fiber boards which have the binder as the continuous phase can excellently be used as construction panels.

The invention will be further illustrated by means of the following examples.

EXAMPLE 1

A linear alternating carbon monoxide/propene copolymer was prepared as follows.

A mechanically stirred autoclave with a volume of 300 ml was charged with 100 ml methanol and 15 g propene. The autoclave was closed and flushed with carbon monoxide. The contents of the autoclave were heated to 70° C. Carbon monoxide was forced in to obtain a pressure of 50 bar. A solution of 357 mg cobalt perchlorate, 1.5 g naphthoquinone, 43.2 mg 1,3-bis(diethyl-phosphino) propane and 41.9 mg palladium acetate in 10 ml tetrahydrofuran was introduced into the autoclave. The pressure was maintained at 50 bar by continuously introducing carbon monoxide. After 22 hours the contents of the autoclave were cooled and the pressure was released. The polymer product was worked-up by flashing off the volatiles.

The yield of polymer was 25 g. The polymer had the appearance of a viscous oil. GPC analysis revealed that the polymer had a weight average molecular weight of 2600.

EXAMPLE 2

A binder containing a copolymer of carbon monoxide and propene was produced as follows.

A sample of a copolymer of carbon monoxide and propene, prepared according to Example 1, was mixed at 60°

C. with a molten sample of 1,6-diaminohexane. Salicylic acid and methanol were added to the mixture. The quantities of the ingredients were such that in the resulting mixture the weight ratio of copolymer, 1,6-diaminohexane, salicylic acid and methanol was 3:0.9:0.2:0.021. After cooling to ambient temperature a paste like material was obtained, which was processable at ambient temperature for at least 30 minutes.

EXAMPLE 3

A binder containing a copolymer of carbon monoxide and propene was produced by repeating the method of Example 2, with the exception that solid salicylic acid was dissolved in the copolymer/1,6-diaminohexane mixture instead of adding the salicylic acid as a solution in methanol. Hence, no methanol was present in the resulting mixture. The binder obtained was a sticky, tough, viscous mass.

EXAMPLE 4

A binder containing a copolymer of carbon monoxide and propene was produced by repeating the method of Example 2, with the exception that the quantity of methanol used was such that in the resulting mixture the weight ratio of the copolymer, 1,6-diamino-hexane, salicylic acid and methanol was 3:0.9:0.2:4.1. The binder so prepared had a viscosity of 0.15 Pa.s at 20° C.

EXAMPLE 5

Uniaxial three-ply wood samples were produced as follows from 2-mm thick wood lamellae of 5×10 cm having the grain in the direction of their longest sides. Spruce, poplar and beech lamellae were used. All three-ply wood samples were produced at least in triplicate.

A binder prepared according to Example 2 was evenly distributed over the lamella surfaces which were to be stuck together, such that per square meter the surface was covered with 75 g binder (the weight of the binder was taken as the total weight of copolymer, 1,6-diaminohexane and salicylic acid). The lamellae were stacked with the grains parallel. The stacks were placed in a pre-heated press and held for one hour at 130° C. at a pressure of 10 kg/cm² laminate cross section (spruce or poplar) or 20 kg/cm² (beech).

The beech plywood samples so obtained had a density of 0.75 g/cm³, the densities of the spruce and poplar plywood samples were 0.5 g/cm³. The flexural strength properties according to ISO 178 and the Charpy impact energy according to ISO 179 were measured at 20° C., 50% relative humidity, the shorter sides of the samples (i.e., the sides perpendicular to the grain) being clamped in the testing apparatus. In order to eliminate the influence of density differences on the mechanical performance the quotients of the relevant data with the density of the sample in g/cm³ was calculated. The performance data so obtained, averages over identical samples, are given in Table I.

The three-ply wood samples were also exposed to cycles consisting of storage at 20° C., 98% relative humidity until constant weight followed by storage at 20° C. in vacuum until constant weight. The reversible swelling was determined from the thickness of the samples after the storage at 98% humidity and after the storage in vacuum. The results are given in Table I.

For comparison (i.e., not according to this invention) three-ply wood samples were produced in the same way but using a phenol formaldehyde resin (IMPRENAL (trademark) LH131, purchased from Raschig AG) or a urea formaldehyde resin (purchased from Caberboard Ltd.), instead of the binder as prepared according to Example 2. The binders tested, viscous liquids, were used as received from the suppliers. The beech plywood samples so obtained had a density of 0.75 g/cm³, the densities of the spruce and poplar plywood samples were 0.5 g/cm³. The same testing procedures as indicated in the preceding paragraphs were applied to these plywood samples. The results are given in Table I.

The data in Table I indicate that a better impact resistance/ strength balance and a better resistance to moisture is achieved when a binder is used which is based on a copolymer of carbon monoxide with propene, compared with conventional binders based on a phenyl formaldehyde resin or a urea formaldehyde resin. The performance data obtained with the plywood samples which contain a binder based on the copolymer of carbon monoxide with propene also had a better repeatability than the other plywood samples, which difference is indicative for a better homogeneity.

TABLE I

| Binder based on | CO/propene copolymer | phenol formaldehyde | urea formaldehyde |
| --- | --- | --- | --- |
| Flexural strength (MPa) | | | |
| poplar | 221 | 197 | 85 |
| beech | 216 | 207 | 79 |
| spruce | 209 | 241 | 76 |
| Flexural E-modulus (GPa) | | | |
| poplar | 19.5 | 21.1 | 17.4 |
| beech | 17.2 | 17.5 | 17.2 |
| spruce | 23.2 | 23.9 | 21.4 |
| Charpy impact energy (kJ/m²) | | | |
| poplar | 47 | 26 | 23 |
| beech | 34 | 28 | 19 |
| spruce | 76 | 58 | 27 |
| Dimensional stability (% swell) | | | |
| poplar | 7 | 14 | 14 |
| beech | 4 | 7 | 10 |
| spruce | 8 | 18 | 24 |

EXAMPLE 6

Two series of cross-ply three layer wood samples were produced from 2-mm thick beech wood lamellae of 10×40 cm using the procedures of Example 5, except for the following differences:

1. The procedures were adapted to the extent that in each plywood sample the grain of the middle lamellae was positioned perpendicular to the grain of the outer lamellae;
2. In one series of samples the wood surface was covered with 90 g binder per m² and in the other series with 15 g binder per m²; and
3. For the mechanical testing rectangular samples were cut of which the shorter sides were perpendicular to the grain in the outer layers; the shorter sides were clamped in the testing apparatus.

The plywood samples based on 90 g binder per m² wood surface (i.e., 180 g binder per m² joint) had a flexural strength of 165 MPa, a flexural E-modulus of 16 GPa and a Sharpy impact strength of 20 kJ/m². The plywood samples based on 15 g binder per m² wood surface (i.e., 30 g binder per m² joint) had a flexural strength of 145 MPa, a flexural E-modulus of 13 GPa and a Sharpy impact strength of 20 kJ/m².

A 35.5×10.8×3.5 mm specimen cut from the latter samples was subjected to dynamic mechanical analysis (DMA) in the temperature range from −100° C. to +300° C. at a rate of 10° C./min temperature increase. A glass transition point was found at 135° C., which was not found in parallel measurements of a blank beech sample and a sample of the binder cured under identical conditions, but in the absence of wood.

EXAMPLE 7

Four uni-axial two-ply wood samples according to EN 204 were prepared using 5 mm thick beech lamellae and, as the binder, the paste prepared according to Example 2. The binder was evenly distributed at one lamellae surface at a rate of 90 g per m² calculated on the total weight of the copolymer of carbon monoxide and propene, 1,6-diaminohexane and salicylic acid (90 g per m² joint). The curing was effected by pressing in a pre-heated press for one hour at 140° C. and 20 kg/m² laminate cross section pressure. Other procedures were as indicated in Example 5.

The shear strength, measured according to EN 204, was 10.6±1.4 MPa on average.

In a similar experiment the binder was applied at a rate of 40 g per m² joint. The shear strength was 11.5 ±0.5 MPa on average.

EXAMPLE 8

Cross-ply three-layer beech wood samples of 20×20 cm were produced following the procedures of Example 5, except for the following differences:
1. The procedures were adapted to the extent that in each plywood sample the grain of the middle lamella was positioned perpendicular to the grain of the outer lamellae;
2. Per square meter, the wood surface was covered with 100 g binder;
3. The pressure was 80 kg/cm²; and
4. For the mechanical testing rectangular samples were prepared of which the shorter sides were perpendicular to the grain in the outer layers; the shorter sides were clamped in the testing apparatus.

The plywood samples so produced had a density of 1.4 g/cm³, the flexural modulus was 30 GPa, the flexural strength was 240 MPa and the Charpy impact energy was 49 kJ/m². The electrical properties, measured according to DTN 7707, were as follows: electrical strength 60–70 kV (parallel to the grain, 25 mm electrode distance, specific resistance $1.3 \times 10^{12}$–$1.5 \times 10^{12}$ Ω.cm (parallel and perpendicular to the grain, −1000 V–+1000 V).

For comparison, in a similar experiment a phenol formaldehyde resin (special electrical grade, purchased from Hoechst-Germany) was used. The curing temperature applied was 165° C. The electrical strength of the obtained samples was about 50 kV, the specific resistance was $0.7 \times 10^{12}$ Ω.cm.

EXAMPLE 9

Fiber board samples were prepared as follows.

Thermo-mechanical spruce wood pulp (TMP) was stirred in a mixing vessel equipped with a horizontally positioned stirrer to the effect that there was an intensive mixing of the pulp with air. While the stirring was continued, a binder as prepared according to Example 4 was sprayed onto the pulp within a period of 30 minutes by using a paint-sprayer and, for drying, air was subsequently passed through the vessel during 15 minutes. Per kilogram board 300 g of binder was used, the weight of the binder being the total weight of copolymer, 1,6-diaminohexane and salicylic acid. The resulting sprayed and dried pulp was pressed in a cold press at 60 kg/cm². The resulting plate was positioned between two polypropene release foils and pressed in a preheated press at 130° C. for one hour at 80 kg/cm². The samples (4 mm thickness) were mechanically tested as indicated in Example 5. The results are given in Table II.

In a comparative experiment (i.e., not according to this invention) these procedures were repeated with the following differences:
1. A phenol formaldehyde resin, obtained from Hoechst-Holland, was used instead of a binder prepared according to Example 4; and
2. Hot pressing was carried out at 160° C. for 20 minutes at 90 kg/cm².

The results are given in Table II.

The results confirm the results obtained in Example 5. It is also shown that the boards produced using the binder based on the copolymer of carbon monoxide and propene is tougher (more bending before fracture) than the boards produced for comparison.

TABLE II

| Binder based on | CO/propene copolymer | phenol formaldehyde resin |
| --- | --- | --- |
| Density (g/cm³) | 1.4 | 1.54 |
| Charpy impact energy (kJ/m²) | 12.5 | 8.5 |
| Flexural strength (MPa) | 80 | 100 |
| Bending before fracture (mm) | 3.5 | 1.5 |
| Flexural E-modulus (GPa) | 5 | 8.5 |

We claim:

1. A wood composite composition comprising, wood, and as a binder, a cured resin composition, wherein the resin composition, prior to curing, comprises a copolymer of carbon monoxide with an olefinically unsaturated compound and a curing agent.

2. The composition of claim 1 wherein the copolymer is a linear alternating copolymer of carbon monoxide and an olefinically unsaturated compound.

3. The composition of claim 2 wherein the olefinically unsaturated compound comprises an aliphatic α-olefin having from 3 to 6 carbon atoms.

4. The composition of claim 3 wherein the aliphatic α-olefin having from 3 to 6 carbon atoms comprises propene.

5. The composition of claim 1 wherein the copolymer has a weight average molecular weight in the range of from 500 to 5000.

6. The composition of claim 5 wherein the copolymer has a weight average molecular weight in the range of from 1000 to 3000.

7. The composition of claim 1 wherein the copolymer contains 1,4-dicarbonyl entities in their polymer chains and the curing agent is a poly-primary-amine.

8. The composition of claim 7 wherein the curing agent comprises a curing catalyst and the curing catalyst comprises an organic acid having a $pK_a$ in the range of from 2 to 5.5, when measured in water at 20° C., and is present in a quantity of from 0.2 to 10.0% by weight, relatively to the weight of the copolymer.

9. The composition of claim 8 wherein the curing agent comprises a curing catalyst and the curing catalyst comprises an organic acid having a $pK_a$ in the range of from 2.5 to 5, when measured in water at 20° C., and is present in a quantity of from 0.5–8.0% by weight, relatively to the weight of the copolymer.

10. The composition of claim 1 wherein a diluent is used in the curable resin in such a quantity that the viscosity of the curable resin, prior to curing, is in the range of 0.005–30 Pa.s.

11. The composition of claim 10 wherein the viscosity of the curable resin, prior to curing, is in the range of 0.03–10 Pa.s, at the temperature of application.

12. The composition of claim 1 wherein the curable resin, prior to curing, comprises a diluent in a quantity in the range of 0.3–3.0% by weight, relative to the weight of the copolymer.

* * * * *